United States Patent [19]
Prasad et al.

[11] Patent Number: 5,956,718
[45] Date of Patent: Sep. 21, 1999

[54] METHOD AND APPARATUS FOR MOVING SUBTREES IN A DISTRIBUTED NETWORK DIRECTORY

[75] Inventors: Ranjan Prasad, Fremont, Calif.; Dale Robert Olds, Sandy, Utah

[73] Assignee: Novell, Inc., Orem, Utah

[21] Appl. No.: 08/810,851

[22] Filed: Mar. 4, 1997

Related U.S. Application Data

[63] Continuation-in-part of application No. 08/357,466, Dec. 15, 1994, Pat. No. 5,608,903.
[51] Int. Cl.$^6$ .................................................. G06F 17/30
[52] U.S. Cl. .................................. 707/10; 707/2; 707/3; 707/103; 707/201; 395/187.01; 395/200.33; 395/726
[58] Field of Search .......................... 707/2, 3, 10, 103, 707/201; 395/187.01, 200.33, 726

[56] References Cited

U.S. PATENT DOCUMENTS

| | | | |
|---|---|---|---|
| 5,001,628 | 3/1991 | Johnson et al. | 707/10 |
| 5,032,979 | 7/1991 | Hecht et al. | 395/187.01 |
| 5,113,519 | 5/1992 | Johnson et al. | 707/201 |
| 5,367,698 | 11/1994 | Webber et al. | 395/200.33 |
| 5,369,778 | 11/1994 | Soucie et al. | 707/103 |
| 5,418,966 | 5/1995 | Madduri | 395/726 |
| 5,634,124 | 5/1997 | Khoyi et al. | 707/103 |

FOREIGN PATENT DOCUMENTS

| | | |
|---|---|---|
| 0663640 | 1/1995 | European Pat. Off. . |

OTHER PUBLICATIONS

Exploiting Read—Mostly Workloads in The FileNet File System, David A. Edwards and Martin S. McKendry, 8283 Operating Systems Review (SIGOPS) 23 (1989) No. 5, New York, US, pp. 58–70.
Performance Study of Client–Server Storage Systems, Elias Drakopoulos and Matt Merges, IEEE, 1991, pp. 67–72.
A Comparison of Two Approaches to Build Reliable Distributed File Servers, Anupam Bhide et al., IEEE, 1991, pp. 616–612.
Mastering Windows 3.1, Robert Cowart, 1992, SYBEX Inc, pp. 132–141.
Managing Personal Files Across Independent File Management Units, Matt W. Mutka and Lionel M. Ni, IEEE 1992, pp. 254–261.
Performance Analysis of Client–Server Storage Systems. Elias Drakopoulos and Matt J. Merges, IEEE Transactions on Computers 41 (Nov. 1992), No. 11, pp. 1442–1452.
Accessing Files in an Internet: The Jade File System, Herman C. Rao and Larry L. Peterson, 8198 IEEE Transactions on Software Engineering 19 (Jun. 1993), No. 6, New York, US, pp. 613–624.
Limited Effects of Finite Storage on a Beneficial File Migration Policy, R.T. Hurley et al., IEEE, 1994, pp. 432–439.

*Primary Examiner*—Thomas G. Black
*Assistant Examiner*—Cheryl R. Lewis
*Attorney, Agent, or Firm*—Dinsmore & Shohl LLP

[57] ABSTRACT

A method and apparatus for reorganizing a distributed directory is disclosed. A source logical group, such as a partition, is identified for reorganization. A destination object is selected to which the source logical group will become subordinate. Multiple simultaneous reorganizations of the distributed directory can be handled.

21 Claims, 8 Drawing Sheets

|         | ROOT      | A         | B         | C      | D         | E         |
|---------|-----------|-----------|-----------|--------|-----------|-----------|
| SERVER S | MASTER   | ———       | MASTER    | MASTER | READ ONLY | MASTER    |
| SERVER T | READ ONLY | MASTER    | SECONDARY | ———    | MASTER    | ———       |
| SERVER U | ———       | READ ONLY | SECONDARY | ———    | READ ONLY | SECONDARY |
FIG. 3
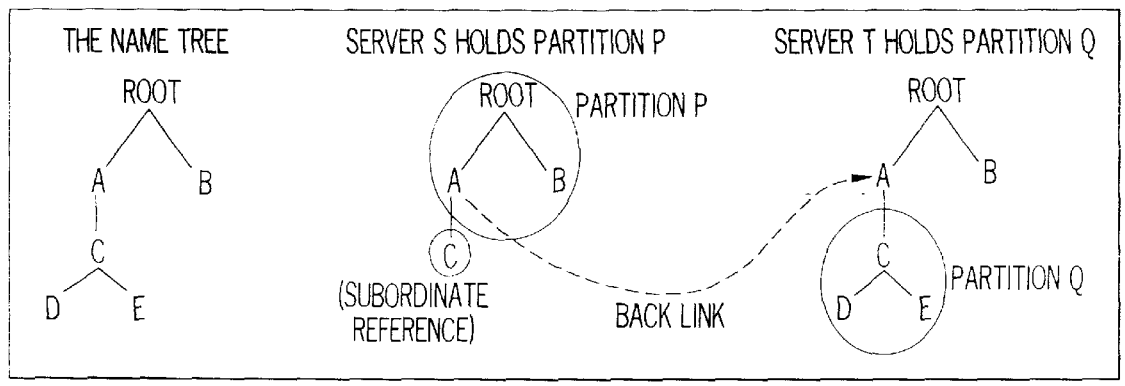
FIG. 4
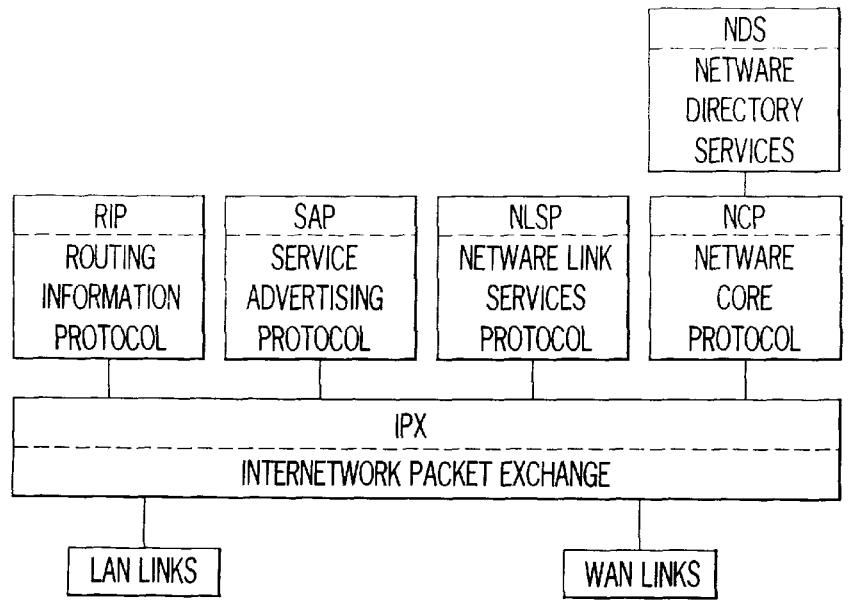
FIG. 5

S1      S2

METHOD AND APPARATUS FOR MOVING SUBTREES IN A DISTRIBUTED NETWORK DIRECTORY

RELATED APPLICATIONS

This application is a Continuation-In-Part of application Ser. No. 08/357,466 filed on Dec. 15, 1994, and now U.S. Pat. No. 5,608,903.

TECHNICAL FIELD

The present invention relates generally to distributed directories, and will be specifically disclosed as a method and apparatus for reorganizing objects within a distributed directory.

BACKGROUND

Technological advances in microelectronics and digital computing systems have resulted in the proliferation of digital computer networks, enabling the distribution of networking services across a wide range of computers participating in the network and over various communications media. Advances in distributing applications have also resulted in a client-server architecture for applications. Under the architecture, the portions of the application that interact with the user are typically separated from the portions of the application that fulfill client processing requests. Typically, the portions of an application that interact with the user are called a client applications or client software, whereas the portions of the application that service requests made by the client applications are called a server applications or server software. In a network environment, the client applications and server applications are generally executed on different computers.

Historically, digital networks in the form of local area networks, a physical collection of personal computers interconnected with network cabling and network interface cards, consisted of a single network server and multiple network clients. To manage which network clients could access the network server, as well as what files, printers, printer queues, and server applications were available to the network clients, the network server maintained information on each of the resources that were attached to the server and the identities of the network clients and users who could use the services of the network server and the scope and nature of the services available to the network clients and users.

As local area networks became more popular, networks grew in size requiring several servers to service the needs of users. With increased size and complexity of networks, came the need for easier management of network servers. Users required access to an increasing number of services that were located on an increasing number of network servers. Several vendors began offering networking servers. Each vendor implemented a different scheme of providing networking services information. In addition, each network server, because of the way the server maintained information about only its networking services still required management of its resources independently of other network servers.

This insular method of maintaining information of networking services fueled research and development of distributed networking directories, databases that spanned networking servers. Thus far, research has resulted in several potential solutions. Three technologies currently hold greater promise for replacing the large number of insular, idiosyncratic directories that now litter many an enterprise's numerous local-area networks and electronic-mail systems. One approach exploits the X.500 distributed network information directory services protocol developed as published by the CCIT and Open Systems Interconnect consortium.

However, while the X.500 protocol appears to hold the greatest promise to provide a robust, distributed directory, the X.500 protocol has been slow to gain acceptance. The X.500 protocol has been plagued from the start with management, interoperability and security problems. The X.500 protocol specification describes a technical framework, interoperability requirements and compliance criteria but does not describe specific implementations. Thus many of the details of implementation have been left up to systems providers.

The X.500 protocol specification describes a distributed directory. The directory provides information services to network clients. The information in the directory can be read as well as modified by users who have applicable access rights.

The information stored in the directory is a collection of objects with associated attributes or properties. FIG. 1 shows an object called "Computer" with some associated properties, such as owner, operator, status, etc. The values of the properties are not shown in the figure but an example of a value for "Owner" might be "Fred." Objects in the directory and their names correspond to things that humans relate to when dealing with computers, namely, users, printers, print queues, networks and information. Objects such as countries, organizations, networks, people and computers are objects you might find in the directory as well.

The directory provides information to users by giving users a hierarchical view of all of the information contained in the directory. The hierarchical view is generally in the form of a tree. FIG. 2 shows a directory. Each of the branches and terminating points or leaves represent objects in the directory. Generally, implementations of the directory organize objects in subtrees, partitions or domains. FIG. 2 also shows the directory organized into partitions or domains. Multiple copies of each partition may be stored in the directory. Software schemas define and determine the number and types of replicas of each partition.

Multiple replicas of a partition are needed to reduce network storage and traffic requirements and speed up directory searches. Replicas are stored in name servers. A name server is a computer in the network, usually a network server. More than one partition can be stored in a name server. Partitions stored in a name server need not be contiguous.

The directory tree provides a logical means of searching for information. The tree is generally patterned after logical groupings such as organizations, organizational units, computers and users. These logical groupings, while extremely useful in helping users find relevant information also creates significant problems in managing the directory.

Each partition forms a major subtree of the directory. Taken together, the partitions form a hierarchical tree of partitions that leads back to a root partition containing the root directory. Where boundaries of two partitions meet, the partition closer to the root is considered superior, and the partition farther from the root is considered subordinate. Thus, FIG. 2, partitions E and C are subordinate to the other partitions.

The present invention solves one of those problems. As objects of the directory change, the directory must be changed as well. Organizations, organizational units, computers and users all move. Today, the legal department may be reporting through the finance department. Tomorrow, one of the employees of the finance department might be moved to marketing. Prior to the invention, systems administrators responsible for maintaining a directory had to move each object in the directory in response to a real change in the status of the object. Unfortunately, no facilities existed for moving course grain objects such as an entire department. If the legal department was to be moved to report to the finance department, each object in the legal subtree had to be moved separately.

SUMMARY OF THE INVENTION

With the present invention any portion of a directory tree provided that it is at the end of the tree may be moved either within a directory or to another directory. With the invention, ease of providing administration of distributed network directories increases. Accordingly, use of distributed network directories will also increase, making pervasive network computing possible.

BRIEF DESCRIPTION OF THE DRAWINGS

The present invention may be more fully understood by reference to the following Detailed Description in conjunction with the Drawings, in which:

FIG. 3 shows a hypothetical scheme of replicas;

FIG. 4 shows how external references use back links;

FIG. 5 shows how the NDS protocol fits within the family of NetWare communications protocols;

DETAILED DESCRIPTION OF THE INVENTION

The present embodiment of the invention, Novell's NetWare Directory Service or NDS, supports moving a terminal or leaf object or partition to allow reorganizing a subtree. Any portion of a directory tree provided that it is at the end of the tree may be moved either within a directory or to another directory.

NDS is based on the X.500 standard and implemented within Novell's NetWare network operating system. Novell implementation of NDS is based on the X.500 standard specification. The X.500 specification does not provide all of the details necessary to implement a distributed network directory.

NDS is implemented within the NetWare network operating system in terms of Novell's native NetWare protocols and a new native protocol called the NDS Protocol. The other components of the native protocols implemented in the NetWare network operating system are illustrated in FIG. 5. IPX is NetWare's native network layer protocol. It provides end-to-end, best-effort datagram delivery. It conveys traffic across a local area network (LAN), a wide area network (WAN), or any internetwork of connected WAN and LAN data-links of like or unlike kinds. An IPX internetwork address has three parts, a Network Number (four bytes) which identifies a network segment, a Node Number (six bytes) which identifies a computer on that segment, and a Socket Number (two bytes) which identifies a software entity within the computer. As an alternative to IPX, NetWare protocols can operate over IP.

The RIP (Routing Information Protocol) supports forwarding of IPX packets over an internetwork. Routers are the devices that connect network segments together. Traditionally, IPX routers exchange connectivity information with each other using RIP to determine proper paths for data packets to take. RIP uses a periodic broadcast mechanism.

The SAP (Service Advertising Protocol) is similar in concept to RIP, but the information exchanged describes services and their addresses (rather than network connectivity). Routers disseminate SAP information as they do with RIP. Through SAP, clients can rendezvous with servers of many kinds. SAP is used to bootstrap a client into the NDS world: a client uses SAP to locate its first NDS server when initializing.

NLSP (NetWare Link Services Protocol) is a newer routing protocol designed to scale to larger environments than RIP and SAP. It plays the role of RIP and SAP for large internetworks. It conveys the same information as RIP and SAP, but instead of using periodic broadcast it sends updates when changes occur.

NCP (NetWare Core Protocol) implements NetWare services such as remote file access. As shown in FIG. 5, NDS packets ride inside NCP packets. While most of this description deals with NDS messages, implementing NDS also involves a few new NCP verbs.

Figure 6:
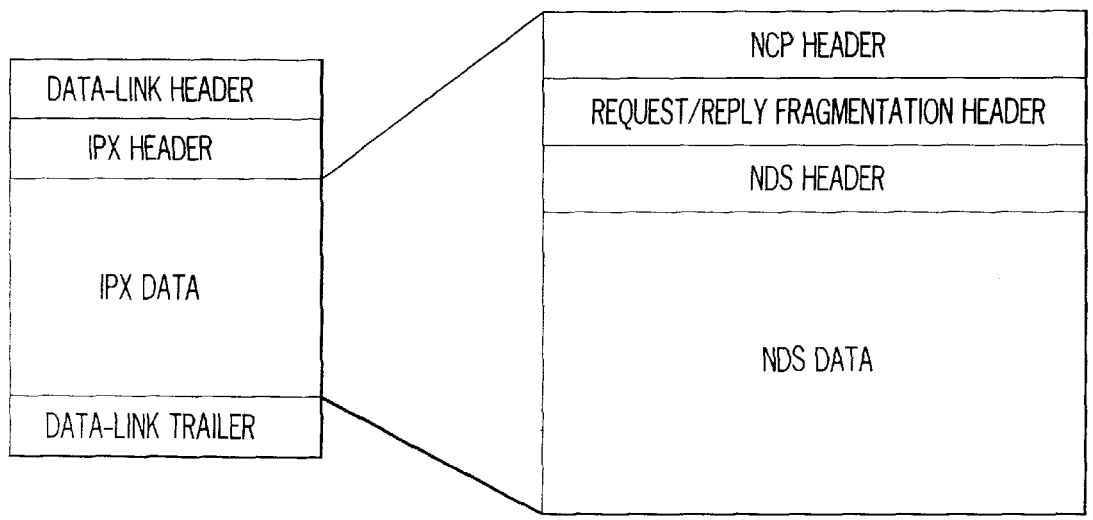
FIG. 6 shows the packet structure of NDS packets.

FIG. 6 shows the structure of NDS packets with NCP packets. The data-link header and trailer are media-specific, and are documented in the standard for each LAN or WAN technology. The message formats in this description define an offset for each field. The offset is from the start of the NCP portion of the packet. The first byte of the NCP header is at offset zero. The request/reply fragmentation header is the means of conveying an NDS request and response in a series of NCP request/response exchanges. The arrangement of fields in the NDS data portion of the packet varies, depending on the verb field of the NDS header. Later sections of this document specify the packet formats in detail.

A Completion Code field exists for NCP replies and for NDS replies that ride (fragmented) within NCP. In both cases, Completion Code=0 means "success." Nonzero values report various error conditions.

Moving a Leaf Object

From a network client vantage point, moving a subtree looks the same as moving a single leaf object. From a server standpoint moving a subtree and moving a single leaf object are quite different. The details of moving a leaf object are provided below. The details of moving an entire subtree, and the move from the vantage point of a server, are considered below. See "Moving a Subtree" below.

When a NDS network client moves an NDS directory entry from one container object to another in the tree, it is possible that the source and the destination container objects are in different partitions. A container object is any object that can hold another object, such as a subtree. When a network client moves the NDS entry, there might not be any servers holding a writeable replica of both partitions.

Figure 1:
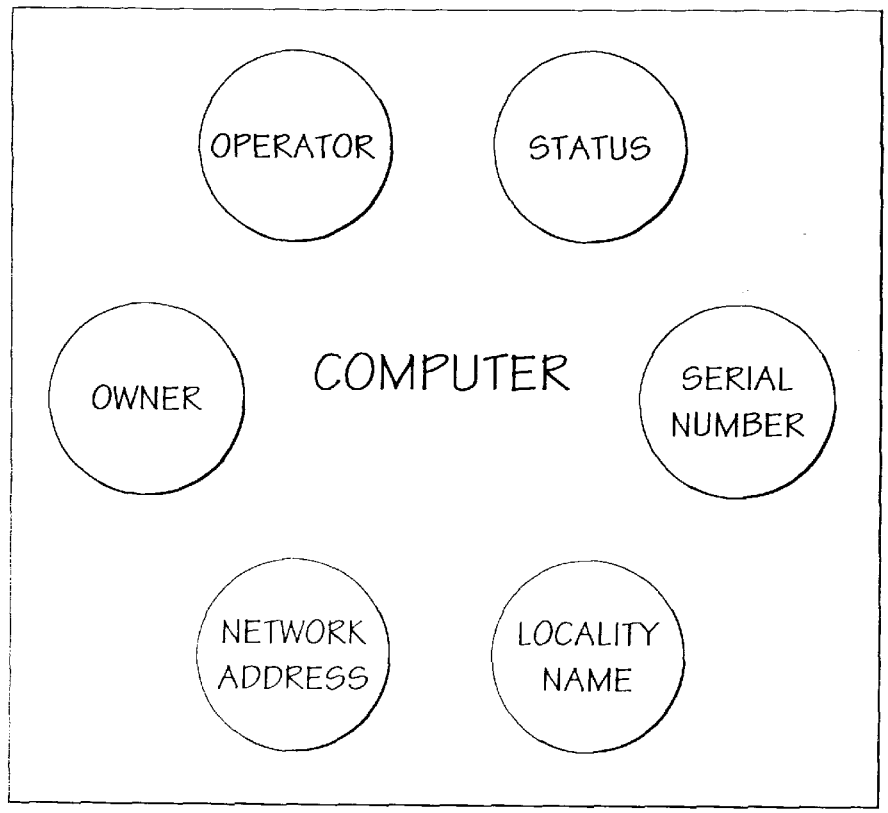
FIG. 1 shows a typical directory object, a computer, with some of its associated attributes.
Figure 2:
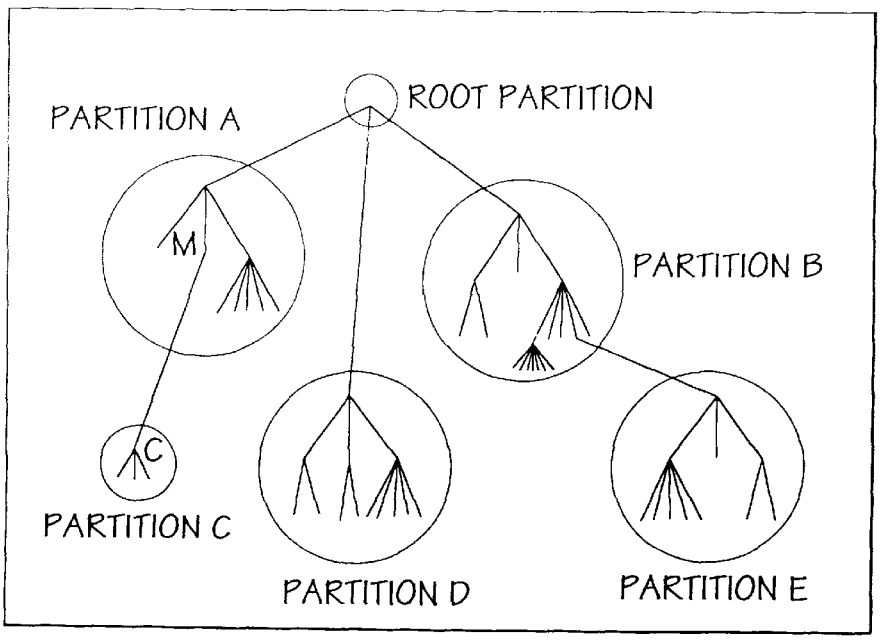
FIG. 2 shows a typical directory tree.

Each partition can have replicas on several servers. Suppose there are three NDS servers for a name tree: servers S, T, and U. One possible deployment of replicas for FIG. 2 among the servers is illustrated in FIG. 3. There are no restrictions on the placement of replicas together on servers; for example, the replicas stored together on a server need not represent contiguous partitions.

Sometimes, a name server has to keep information about objects that can be outside the replicas it holds. The best examples are the objects superior to its replicas in the tree. Consider FIG. 4. The objects A and Root are not in a replica of a partition on server T. But to know the name of objects in Q, T needs the name of A. This information is kept in a data structure called an external reference. Since an external reference is not in a replica, it is not synchronized with other servers. However, it does have an entry identification valid on the server where it resides (T in this case). If A's name changes, the external reference has to be updated. To allow this, the object A has a back link attribute value pointing to each external reference to A. This is the dotted line in FIG. 4.

Because there might not be any servers holding a writeable replica of both partitions when a client attempts to move an NDS entry, moving an object involves two operations: "Begin Move Entry" and "Finish Move Entry."

The detailed steps of moving a leaf object are:

1. The client identifies two servers. The source server is the one holding the master replica of the object being moved. The destination server is the one holding the master replica of the container into which the object is being moved. Sometimes, the servers are the same, but the same procedure applies regardless.
2. The client sends a "Begin Move Entry" request to the destination server. At this point, the destination server enforces access control to permit or deny the operation. The "Begin Move Entry" NDS Protocol verb has the structure identified in Table 1.

TABLE 1

| Begin Move Entry Structure (42 (0x2A)) | | |
|---|---|---|
| Offset | Content | Type |
| | Request Format | |
| 32 | Version = 0 | Int4 |
| 36 | Flags = 0 | Int4 |
| 40 | Destination Parent Entry ID | Int4 |
| 36 | New RDN | Ustring |
| ... | Align4 | |
| ... | Source Server's DN | Ustring |
| | Reply Format | |
| 16 | Completion Code | Int4 |

*Int4 - a byte integer transmitted in Low-High order
*Ustring - a null-terminated Unicode string. Unicode is a fixed-length character encoding scheme, 16 bits per character. It defines encodings from all the world's languages. The representation was chosen to have fixed width to facilitate processing. In Unicode, the range from 0x0000 through 0x007F is seven-bit ASCII (that is, ANSI X3.4).
*Align4 - is a pad field of zero to three bytes making the next field start on two-byte boundary.
* . . . - When a variable-length field occurs, the subsequent fields are not at a fixed offset. Ellipses appear in the offset column to indicate this.
*Completion Codes Success = 0

TABLE 1-continued

| Begin Move Entry Structure (42 (0x2A)) | | |
|---|---|---|
| Offset | Content | Type |

*Distinguished Name or DN - is a representation of the sequence of hierarchical components. An NDS object is identified by its name and by the names of the objects in which it is contained, in a hierarchical tree structure. The object's own name is called its partial name, or RDN (for Relative Distinguished Name). Proceeding up the hierarchy, each containing object has its own RDN. For example, CN = Jan. O = Acme. C = US has three partial names (RDNs). The Common Name is "Jan." The Organization Name is "Acme." And, the Country Name "US."

This request is addressed to the server holding the master replica of the destination container. The new parent of the NDS object is identified by Destination Parent Entry ID. Within that container, its relative distinguished name will be New RDN. The client also identifies the server holding the master replica of the existing entry, by sending the Source Server's DN.

3. If no anomalies are detected, the destination server replies with Success. At the same time it records the details of the move operation and starts a ten-minute timer. If the timer expires before the operation completes, it purges its record of the move and step 5 will not complete successfully.
4. The client makes a Finish Move Entry request to the source server. The Finish Move Entry NDS Protocol verb has the structure identified in Table 2.

TABLE 2

| Finish Move Entry (43(0x2B)) | | |
|---|---|---|
| Offset | Content | Type |
| | Request Format | |
| 32 | Version = 0 | Int4 |
| 36 | Flags | Int4 |
| 40 | Source Entry ID | Int4 |
| 44 | Destination Parent Entry ID | Int4 |
| 48 | New RDN | Ustring |
| ... | Align4 | |
| ... | Destination Server's DN | Ustring |
| | Reply Format | |
| 16 | Completion Code | Int4 |

Flags
0x00000001 Remove Old Name Values
Completion Codes Success = 0
Remarks
This request is addressed to the server holding the master replica of the object being moved. The Source Entry ID identifies the object on that server. The client identifies the server holding the master replica of the destination container by sending the Destination Server's DN. The Destination Parent Entry ID identifies the parent container itself The new parent of the NDS object is identified by Destination Parent Entry ID. Within that container, its relative distinguished name will be New RDN. If the Remove Old Name Values flag is set, old values of the naming attribute remain as multiple values of the attribute (but not as part of the RDN). This choice is unavailable if the naming attribute is single-valued. If the flag is zero, all prior values of the naming attribute are deleted before New RDN is added.

5. The source server makes a Restore Entry request to the destination server to transfer the complete object information. This can take several iterations. If there is a temporary anomaly, this step is retried several times before completing or being abandoned. The structure of the Restore Entry NDS Protocol verb is provided in Table 3.

TABLE 3

Restore Entry (46 (0x2E))

| Offset | Content | Type |
|---|---|---|
| | Request Format | |
| 32 | Version = 0 | Int4 |
| 36 | Request Flags | Int4 |
| 40 | Iteration Handle | Int4 |
| 44 | Parent Entry ID | Int4 |
| 48 | Relative Distinguished Name | Int4 |
| . . . | Align4 | |
| . . . | Source Distinguished Name! | Ustring |
| . . . | Align | |
| . . . | Data Size = N | Int4 |
| . . . | Entry Data | Byte [N] |
| | Reply Format . . . Moving = 0 | |
| 16 | Completion Code | Int4 |
| 20 | Iteration Handle | Int4 |
| | Reply Format . . . Moving = 1 and More = 1 | |
| 16 | Complete Code | Int4 |
| 20 | Iteration Handle | Int4 |
| 24 | Reserved Field = 0 | Int4 |
| | Reply Format . . . Moving = 1 and More = 0 | |
| 16 | Completion Code | Int4 |
| 20 | Reply Flags = 0x00000400 | Int4 |
| 24 | New Distinguished Name | Ustring |
| . . . | Align4 | |
| . . . | New Tuned Name | Tuned Name |

*Request Flags - 0x00000001 More, 0x00000002 Moving
*Reply Flags - 0x00000400 Reply includes the New Tuned Name
*Completion Codes Success = 0
!Note: The Source Distinguished Name field is present if and only if the Moving request flag is set to one.
Remarks
This operation serves two purposes.
(a) Restoring an entry previously backed up to an external medium.
(b) Conveying an entry's information to its new location when moving an NDS leaf entry. The Moving flag indicates which case it is; zero for (b); one for (b). In case (b), collision with an existing name is considered an error.
The Parent Entry ID indicates the immediate parent of the entry being restored.
The Relative Distinguished Name identifies the entry itself.
The Source Distinguished Name identifies the entry's former name, in case of a move operation.
The Iteration Handle is used differently here from elsewhere. In other situations, the amount of data returned from the server is (potentially) larger than a single NDS message can accommodate. Here, the opposite holds. The request can be larger than the largest NDS message. When the More bit of the Request Flags field is set to one, the Restore Entry request is incomplete, and is to be continued in another Restore Entry request. If the bit is reset to zero, the client is indicating the completion of a series of Restore Entry requests. Only on completion does the server process the request. On the first NDS request of the series, the client sets the Iteration Handle to 0xFFFFFFFF; on subsequent requests, to the value returned by the server in the preceding reply. The reply format depends on the Request Flags, as indicated above. When moving an entry, the last reply conveys information about the entry in its new location; its new distinguished name (in typed form), and its new Tuned Name.

Figure 7:
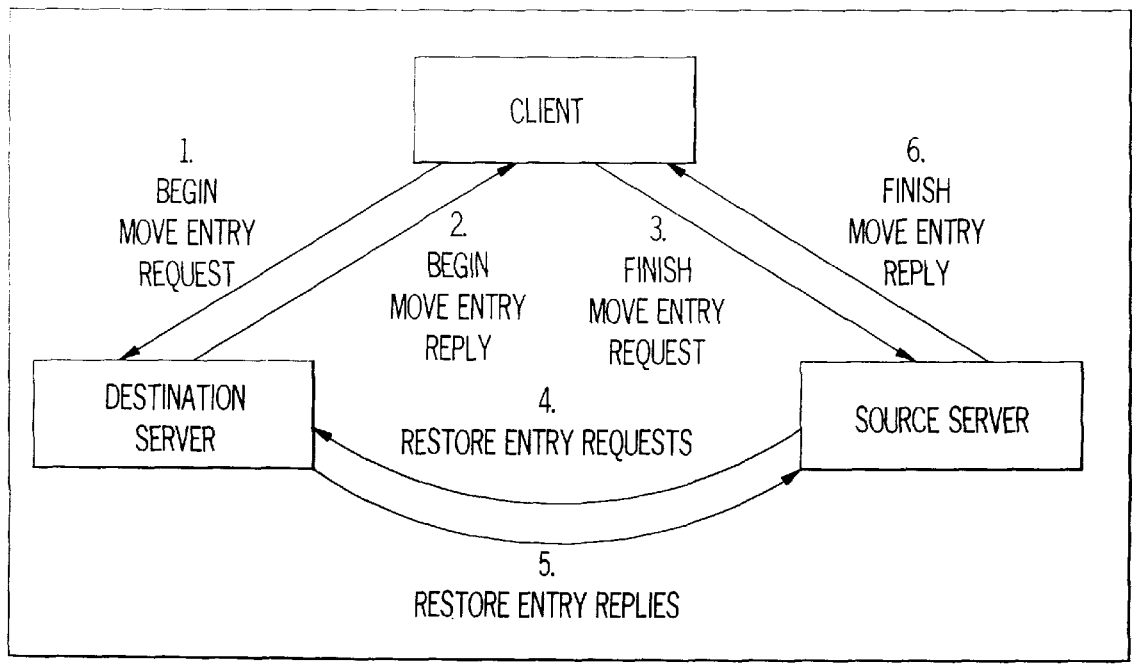
FIG. 7 shows the sequences employed by the invention to move a leaf object.

6. If step 5 was successful, the source server removes the entry from its active database. It creates a moved obituary for the entry, identifying the destination location. The obituary propagates to replicas of the source partition through the synchronization channel.
7. The source server sends a Finish Move Entry reply to the client. FIG. 7 illustrates the three-party exchange. The additional steps that follow show the interaction of a wider group of network servers.
8. If another server has an external reference to the old copy of the moved object, the source server holds a Back Link attribute for the object identifying the other server. Using information in the Back Link, it notifies the other server to update the external reference.
9. This uses the Synch External Reference operation. The source uses a "Back Link. . . Moved" obituary for each other server to keep track of which ones have been notified. If new back links appear while this operation progresses, corresponding "Back Link. . . Moved" obituaries are created. The structure of the Synch External Reference NDS Protocol verb is provided in Table 4.

TABLE 4

Synch External Reference

| Offset | Content | Type |
|---|---|---|
| | Request Format | |
| 32 | Version = 0 | Int4 |
| 36 | Flags = 0 or Purge obituary | Int4 |
| 40 | Remote ID (hint) | Int4 |
| 44 | Entry Name | Ustring |
| . . . | Align4 | |
| . . . | Parent | Tuned Name |
| . . . | Align4 | |
| | Obituary Information | |
| | 1) Restored | |
| | 2) Dead | |
| | 3) Moved | |
| | 4) New RDN | |
| | Common Parameters | |
| Type | Int2 | |
| Flags | Int2 | |
| Unused | Int4 | |
| Creation Time | Time Stamp | |
| | Data Parameters | |
| Restored | Creation Time | |
| | Restored CTS | |
| Dead | NULL | |
| Moved | Moved Destination Name - Tuned | |
| New RND | RDN - Name | |

10. Meanwhile, starting at step 3, the destination object has an Inhibit Move obituary attribute attached, indicating that a move is under way. As long as this attribute exists, the object cannot be moved again or deleted. This prevents race conditions as things settle down. Replica synchronization propagates the new object (with its Inhibit Move obituary) throughout replicas of the destination partition.
11. When (a) the deletion of the source object has been propagated throughout the source partition, and (b) the notifications of step 6 have been completed, the object is about to be purged. The source server notifies the destination server using the Release Moved Entry operation. At this point, the destination server removes the Inhibit Move obituary attribute from the new object. Through replica synchronization, the attribute removal propagates to other replicas of the destination partition. When this has occurred, and the destination server purges the obituary, the moved object becomes eligible to be moved again.

Moving a Subtree

As indicated above, from the client's viewpoint, moving a subtree looks the same as moving a single entry. The same Begin Move Entry and Finish Move Entry operations apply, as illustrated in FIG. 3. The exchange among servers is quite different, however.

Figure 8:
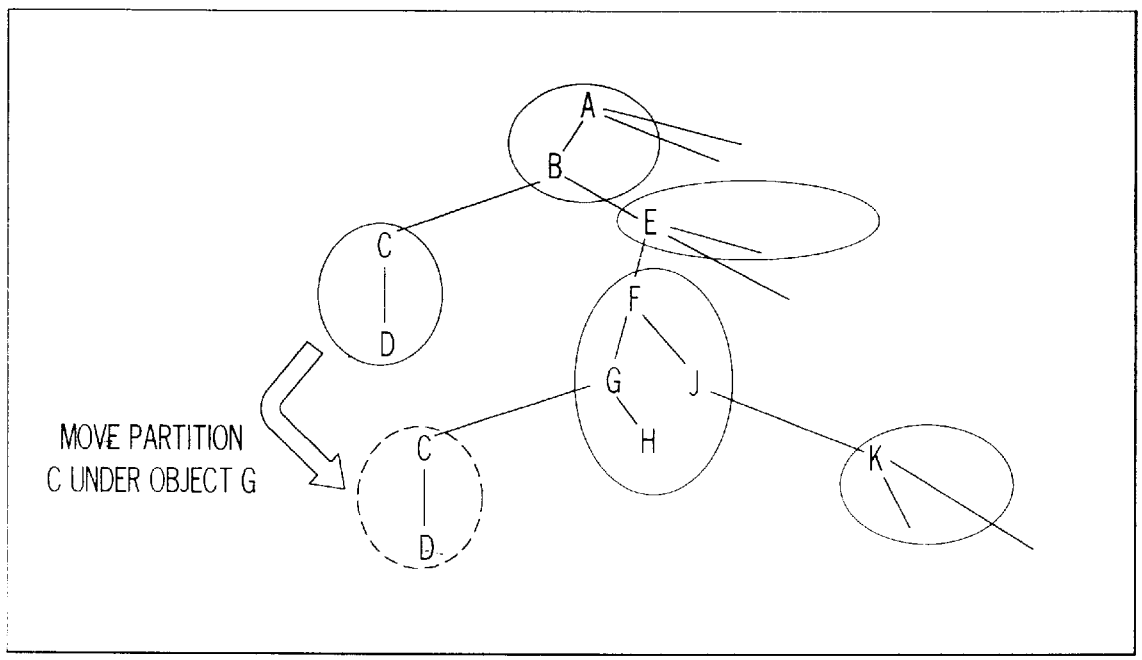
FIG. 8 shows the movement of a subtree.

FIG. 8 shows the move of a subtree. In the example, partition C is being moved under object G. (As customary, the partition is named by its root-most object.) G is in partition F. Partition A is the parent of partition C.

Three partitions participate in the operation. Each has a master replica. In the following detailed discussion of the operation to move a subtree the following terminology is used. The discussions assumes that some of the three partitions can be the same, that some of the servers can be the same, and that:

S is the server holding the master replica of partition A.

T is the server holding the master replica of partition C.

U is the server holding the master replica of partition F.

V is the server holding the master replica of server U's object.

1. The client sends a Begin Move Entry request to U. U enforces its access control to permit or deny the move operation.

2. If all is well, U replies with Success. At the same time, it records the details of the operation and starts a ten-minute timer. If the timer expires before T responds, U purges its record of the move details and the operation will not complete.

3. The client sends a Finish Move Entry request to T. T enforces its access control and the directory schema rules. Also, T locates the object representing server U in the name space, and identifies the server, V, holding the master replica of U's object. It sends V a "Control. . . Get Entry Move State" request to determine if U's object is itself moving. If it is moving, the subtree move operation cannot proceed. If any of these checks reveal a problem, T sends an error reply to the client and the operation terminates. The structure of the Control. . . Get Entry Move State NDS Protocol verb is provided in Table 5.

TABLE 5

Control . . . Get Entry Move State

| Offset | Content | Type |
|---|---|---|
| | Request Details | |
| 40 | Verb = 2 | Int4 |
| 44 | Entry ID | Int4 |
| | Reply Details | |
| 20 | Parent Entry ID | Int4 |

This operation reports if an entry is being moved or not. The entry is indicated by Entry ID. If the entry is being moved, the completion code "Move in Progress" is returned, and the Parent Entry ID reports the new parent of the object.

4. T sends a Start Move Tree request to U. U checks the request against its expected details. It also checks that its software version—and the versions of servers identified in the back links of the destination partition root object (F)—are high enough that they support moving a subtree. If all is well, it sends a Success reply to T. In the reply, the Partition Overlap flag is set if partitions A and F are the same partition. The structure of the Start Move Tree NDS Protocol verb is provided in Table 6.

TABLE 6

Start Move Tree

| Offset | Content | Type |
|---|---|---|
| | Request Details | |
| 40 | Version = 0 | Int4 |
| 44 | Flags | Int4 |
| 48 | Revision | Int4 |
| 52 | Destination ID | Int4 (on destination server) |
| . . . | Source Name | Tuned Name |
| . . . | Align4 | |
| . . . | New RND | Ustring |
| | Reply Details | |
| 20 | Version | Int4 |
| 24 | Flags | Int4 |
| 28 | Source ID | Int4 (on destination server) |
| 32 | Destination Root ID | Int4 (on destination server) |

TABLE 6

Start Move Tree

| Flags - | Mt_Created_ExtRef |
|---|---|
| | Mt-Partition_Overlap |

5. U sets F's partition operation to Move Subtree Destination. It sets the partition state and the replica states to Move State 0, and the Partition Control Distinguished Name to identify C. If the leaf name of the object is being changed in the course of the move, it also adds a Tree Old RND obituary recording the prior name. (With this information, a server can do efficient lookups even if packets arrive from not-yet synchronized servers using an unexpected name.) It starts propagating these changes to the replicas of partition F.

6. T sets C's partition operation to Move Subtree Source. It sets the replica states to Move State 0. It also creates three partition control attributes. Each of the three has State=Moved State 0 and Operation=Move Subtree Source. The Distinguished Name depends on the Type, as follows:

| Type | Distinguished Name |
|---|---|
| 0 | Identifies G (new parent object). |
| 1 | Identifies B (old parent object). |
| 2 | Empty string in the Partition overlap case; otherwise, identifies A (root object of partition immediately above C). |

It starts propagating these changes to the replicas of partition C.

7. If the leaf name (relative distinguished name) of the object is being changed in the course of the move, it also adds a Tree New RND obituary recording the new name. (With this information, a server can do efficient lookups even if packets arrive from not-yet synchronized servers using an unexpected name). T makes a list of servers to be notified of the operation. The following servers are included in the list (duplicates are suppressed):

Servers holding replicas of partition C.

Servers holding replicas of partition F.

Servers holding external references to objects in C (as identified by back links on the objects).

this is the "Notification List." It is recorded as a Move Subtree obituary for each server on the list. T starts propagating all these changes to the replicas of partition C.

8. If the Partition Overlap flag was not set in step 4, T sends a Control request to S, indicating Lock Partition for partition A (C's parent). This prevents other partition operations on partition A while the move is in progress. For moves within the same partition, it is unnecessary to lock the parent.
9. T sends a Finish Move Entry reply to the client. The client is out of the picture from this point onward.
10. T drives completion of the operation. It sends a Move Tree request to every server in the Notification List, driven by the secondary obituaries. The structure of the Move Tree NDS Protocol request is provided in Table 7.

TABLE 7

Move Tree

| Offset | Content | Type |
|---|---|---|
| | Request Details | |
| 40 | Version = 0 | Int4 |
| 44 | Flags | Int4 |
| 48 | Parent Name | Tuned Name |
| ... | Align4 | |
| ... | Name | Ustring |
| ... | Align4 | |
| ... | Creation Time | Time Stamp |
| ... | Destination Parent | Tuned Name |
| ... | Align4 | |
| | Name Flags | Int4 |
| | New Name | Int4 |
| ... | Align4 | |
| ... | Replica Pointer for Master | |
| | Reply Details | |
| 20 | Version | Int4 |
| 24 | Flags | Int4 |
| 28 | Replica Root ID | Int4 |

It persists with periodic retries until all have been contacted. As each server is contacted successfully, T sets the corresponding obituary's Notified flag. The request conveys:
  The Tuned Name of C (the source)
  The Tuned Name of G (the destination)
  The Replica Pointer for T (the master server of partition C)
11. T adds a moved obituary to its entry for C, so that any requests about an object in partition C using its old name can be treated correctly while the operation is in progress. When a server, W, on the Notification List receives the request, its action depends on what replicas it holds of partitions C and F. In the following table:
R means the server holds a replica of the partition.
E means the server holds an external reference to the partition's root object.
N means the server holds neither of the above.

| Case | 1 | 2 | 3 | 4 | 5 | 6 | 7 | 8 | 9 |
|---|---|---|---|---|---|---|---|---|---|
| Partition C | R | R | R | E | E | E | N | N | N |
| Partition F | R | E | N | R | E | N | R | E | N |

| In Cases 1, 2, 3 and 5: | W locally switches its record of C's parent from B to G. |
|---|---|
| In Cases 4 and 7: | W locally creates a subordinate reference for partition C. Its reply has the Created Subordinate Reference flag set, informing T to add the subordinate reference to C's replica list. |
| In Case 6: | W locally creates an external reference for G. Its reply has the Created External Reference flag set, informing T to create a back link to W. |
| In Cases 8 and 9: | These do not occur. Such servers would not be on the Notification List. |

12. Once the servers on the Notification List have been successfully contacted, T sends another request to the same Notification List: End Move Subtree. This causes the Moved obituaries to be purged. Every server has seen the new name, so it is no longer necessary to deal with requests that use objects' old names. As each request completes successfully, the corresponding obituary has the Purgeable flag set.
13. Once all the obituaries are marked Purgeable, T sends a Control request to U and (in the non-Partition Overlap case) to S, indicating Unlock Partition for A and F (respectively). A server receiving this request sets the partition state and the replicas' states to On, and propagates the change to the partition's replicas through the synchronization channel. Finally, T performs the Unlock Partition operation itself for C.

Handling Multiple Simultaneous Moves

In another embodiment of the invention, multiple simultaneous moves of logical groups in the distributed directory are handled. This functionality is particularly desirable where access to and the services provided by the distributed directory will be continued with minimal interruption. This preferred embodiment builds on the foregoing embodiment of move subtree by changing the manner names are handled during background server operations.

In the foregoing embodiment of move subtree, only one component, the Relative Distinguished Name ("RDN") of an object's Distinguished Name ("DN"), may be in transition due to a move at any given time. Therefore, if a partition is in the process of being moved, it is preferred that a separate partition or move tree operation will not be accepted for that partition. This is enforced by serializing the partitioning and move subtree operations. In addition, if only leaf partitions are being moved, a move subtree operation will result in only one RDN in any object's DN to be effected/remapped.

Figure 9:
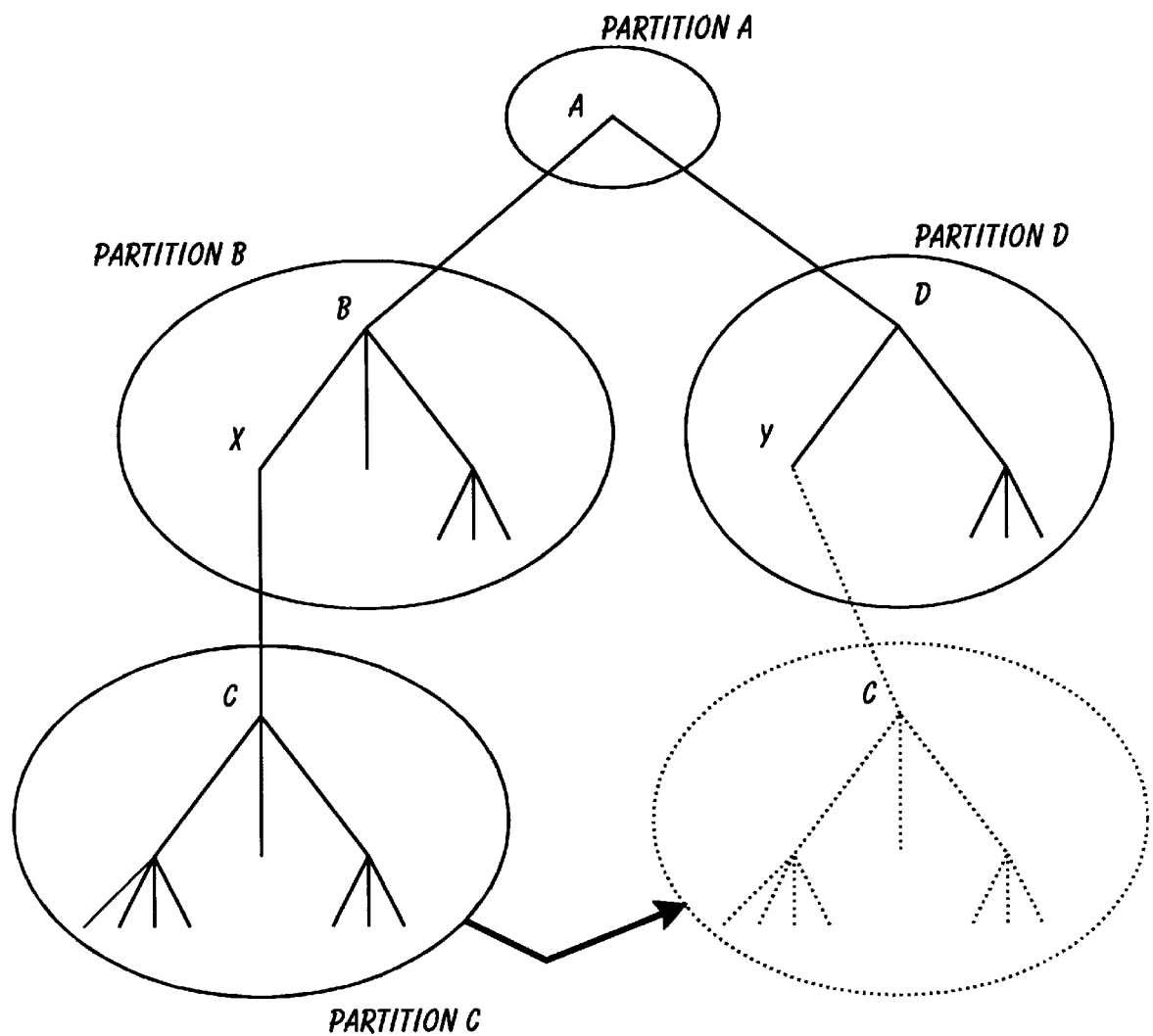
FIG. 9 shows an example of moving a leaf portion.
Figure 9:
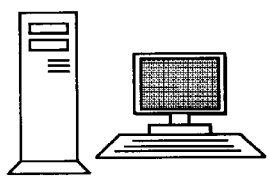
Figure 9:
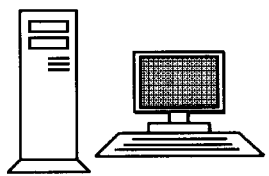
Figure 9:
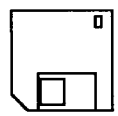

FIG. 9 illustrates the foregoing move subtree embodiment. Assume partition C (the source partition) is being moved from being directly subordinate to the parent object X in partition B (the parent partition), to being directly subordinate to the destination object Y in partition D (the destination partition). Object C's DN will change from C.X.B.A to C.Y.D.A. Assume that there are two servers holding replicas of object C: S1 and S2. The following table summarizes portions of the processing performed for referencing the source object C.

TABLE 8

| Transmitter (S1) | Receiver (S2) | Comments |
| --- | --- | --- |
| Has seen new name | Has seen new name | A local MapNameToID (LookForTunedRDN or FineTuneRDN) can locate the object on the receiver. This is the simplest scenario. |
| Has seen new name | Has NOT seen new name | The transmitter sends New Name to the receiver. In this case C.Y.D.A. Since the receiver has not seen the new name it creates it as a reference object. When the MOVED obituary is skulked to the receiver the old object will be collapsed with this reference as a part of the move. |
| Has NOT seen New Name | Has seen New Name | A local MapNameToID (LookForTunedRDN or FineTuneRDN) can locate the object using the forward reference placed at the old object location. This case is similar to the first case listed above. In both of these cases a reference for the object is not created but the actual object is found. |

The various rows of the table indicate the state of the object as perceived by server S1 and S2. The state of the object refers to whether the server is aware of the move or not, i.e., whether it internally refers to the object by its old name (C.X.B.A) or by its new name (C.Y.D.A). It should be noted that the name component effected by the move in this case is the RDN of the moved object.

During the move process, each server that performs the move operation creates a forward reference (in the form of an OBT_MOVED obituary) from the previous location of the object to the new location. Only the former and final names are known to the server. In this example a forward reference is placed at location C.X.B.A to point to C.Y.D.A This may be due to a reference synchronization or a MapNameToID request. DN transitions during a move subtree operation are handled in a similar fashion. Since an object is not allowed to be moved until any prior moves on it have completed, each component can have at most two names: a source name and a destination name.

Figure 10:
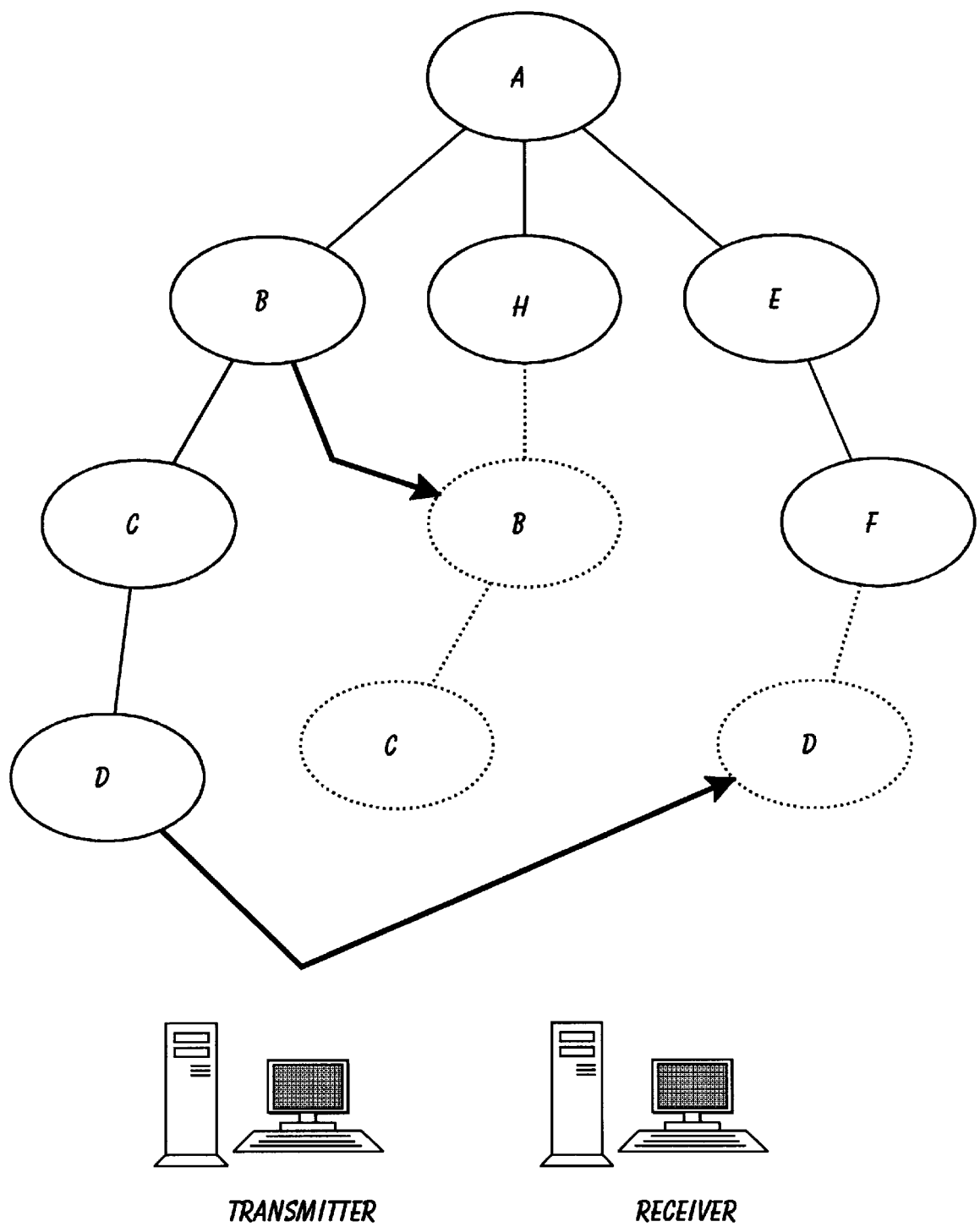
FIG. 10 shows an example of a multiple simultaneous moves of partitions.

The handling of multiple simultaneous moves builds on the basic architecture of a standard move tree operation. Consider FIG. 10, where for illustrative purposes only the root objects are depicted, which are assumed directly subordinate to the parent partition's root object. The following simultaneous moves have been requested: D.C.B.A moves to D.F.E.A and B.A moves to B.H.A. In this example we are allowing a non-leaf partition to move (i.e. B.A) as well as a leaf-partition (i.e. D.C.B.A). This introduces multiple components in the name path for D.C.B.A to change simultaneously. Depending on the name states known to the different servers, several references may be created representing various stages of the move operation. After the move is completed, these references will need to be collapsed successfully.

When servers on the notification list communicate to one another, they refer to and identify an object affected by a move, not only by the final name state of an object, but also by any and all intermediate name states and variations that object may have based on the multiple objects in its name path being moved. This applies for objects within the partition being moved as well as all objects subordinate to the partition. For instance, the following table summarizes the name states for object D.C.B.A seen by a server depending on whether the move has been performed on the server or not.

TABLE 9 variations of name states

| D.C.B.A -> D.F.E.A | B.A -> B.H.A | Name States |
| --- | --- | --- |
| No | No | D.C.B.A |
| Yes | No | D.C.B.A |
|  |  | D.F.E.A |
| No | Yes | D.C.B.A |
|  |  | D.C.B.H.A |
| Yes | Yes | D.C.B.A |
|  |  | D.F.E.A |
|  |  | D.C.B.H.A |

The number of name states are increased as more components are being moved and as moves are executed on a server. The receiver uses the names in the name state list to locate the object. Preferably, no references should be created unless requested by the transmitter. This will make it possible to locate a partition root even if multiple components in its name path are in the process of being moved. In order to construct the names in the name state list, a backward pointer is maintained when an object moves. This backward pointer will be used to construct the old name of a moved component.

If during the process of the move a transmitter sends a Distinguished Name to a receiver, it constructs a list of names that include the current name of the entry as known to the transmitter followed by any previous names the entry may have had. These previous names (or name states) may vary based on moves that are currently in progress for objects in the name path of this entry. For example, in the table above multiple names exist for entry D.C.B.A because one of its components, namely B.A is moving. Depending on the move state on the receiver the receiver may "know" the entry for D.C.B.A as one of the following:

TABLE 10

| Name known as | State of Moves on receiver |
| --- | --- |
| D.C.B.A | None of the moves have occurred on the receiver |
| D.F.E.A | D.C.B.A -> D.F.E.A |
| D.C.B.H.A | B.A -> B.H.A |
| D.F.E.A | D.C.B.A -> D.F.E.A |
|  | B.A -> B.H.A |

It can be seen from the above table that the sequence of moves (i.e, if D or B moves first) dictate which "name" the receiver will know the entry by. Regardless, the receiver and the transmitter will know the entry by one of the names in the name list. As such, information about the object being transmitted can be processed on the fly while the move is in process without interrupting distributed directory services.

The transmitter constructs a list of names that the receiver may know the entry by. This list acts as a hint for the receiver in locating the correct entry. Once the correct entry has been located processing can resume normally. If no moves are in progress for any component in the name path for the object then the list will consist of only one name, which is the current state of the entry.

The receiver tries to locate the entry by processing each of the names in the list. Once a match has been found the entry is identified and the rest of the names in the name list may be ignored. Preferably, the receiver will not create a reference for an entry it has not seen unless explicitly requested by the transmitter. Therefore, the issue of collapsing a reference object with the real object when the move completes may not arise.

The following functions can be used for are used to build a list of names for a specified entry. An entry is a complete object identifier. It is constructed by starting with the relative identifier of an object and adding the relative identifier of each ancestor object until the relative identifier of the root of the object hierarchy is added. All parameters are called by value and the called routine may modify the values in any way.

AddComponent()—This function adds a component to a specified name. For example, if the name is "a.b.c" then AddComponent(name, d) will result in name becoming "a.b.c.d". Calling convention for this function is: name= AddComponent(name, entry).

GetMovingFromComponent()—This function returns the moved from component for an object that may have moved. It uses the MOVED_FROM indicator and returns the moved from name and creation time. (Other data may be returned that identify an object uniquely. Refer to the tuned name patent). If entry has no MOVED_FROM indicator then component is null. The calling convention for this function is: component=GetMovingFromComponent (entry).

RemoveComponent()—This function removes a component from a specified name. For example, if name is "a.b.c.d", then RemoveComponent(name) returns name as "a.b.c". The following calling convention is used for this operation is: name=RemoveComponent(name).

AddToNameList()—This function adds a specified name to a list of names. The list may be an array or some other data structure. The following call convention may be used for this operation is: AddToNameList(list, name).

GetRootMostComponent()—This function gets the root most component of a name. It does not modify the name. In other words, the root most component returned is not removed or modified from the name. For instance, if name is "a.b.c.d" then this function returns "d". The calling convention for this function is: entry= GetRootMostComponent(name).

GetParentOfEntry()—This function returns the parent (ancestor) of the specified entry. The calling convention for this operation is: parent=GetParentOfEntry(entry).

The following code segment illustrates how the foregoing functions can be used to build a list of name variations:

```
BuildNameList(namelist, partialName)
{
    // Get the root most component of the partial name.
    entry = GetRootMostComponent(partialName);
    while (entry != root)
    {
```

```
        fromEntry = GetMovingFromComponent(entry);
        if (fromEntry != null)
        {
            partialName = RemoveComponent(partialName);
            partialName = AddComponent(partialName, fromEntry);
            BuildNameList(nameList, partialName);
            partialName = RemoveComponent(partialName);
            partialName = AddComponent(partialName, entry);
        }
        entry = GetParentOfEntry(entry);
        partialName = AddComponent(partialName, entry);
    }
    AddNameToList(nameList, partialName);
}
```

The ability to handle multiple simultaneous moves additionally facilitates moving non-leaf partitions. While the previous embodiments of move subtree could handle moving a non-leaf partition, it is preferred that only leaf partitions be moved. This is because it is relatively simple to check to see if the source and destination partitions are involved in such an operation and lock such partitions from other move tree or partition operations. As a move of a non-leaf partition could effect any or all partitions up or down the tree relative to the parent, source or destination partitions, the steps of checking and locking these partitions could be an expensive and time consuming operation, particularly with large and complicated trees spanning many different servers. If a system can handle multiple simultaneous moves, the need for locking partitions would be eliminated and non-leaf partitions can be moved without having to go through the process of traversing the distributed directory and locking relevant partitions.

Moving a Non-Root Container Object

In the several embodiments for move subtree, discussed above, the logical group being moved is a partition in the distributed directory. In other words, the root-most object defining a partition boundary along with its subordinate objects within the partition are being moved. One reason to enforce this aspect is that move subtree does not move any physical data but only remaps the distinguished names of the objects that have been effected. A non-root object could be moved, but such a move would traditionally require moving the object physically by performing a backup and restore operation on the object. The non-root object being moved would require data in the entire tree to be physically moved, a slow and burdensome process. In another embodiment of the invention, a non-root object in a partition can be moved using the foregoing functionality of move subtree. This is achieved by creating a partition boundary as a part of the move. This new logical group is then moved using the foregoing move subtree operations. The new logical group may or may not be left as a partition after the move.

Assuming the schema rules and access requirements are satisfied, the move of a non-root container is achieved by first performing a partition split operation, preferably automatically, in the background before performing the actual move. The split is performed only if the object being moved is not a partition root or a leaf object. A partition root would use any of the move subtree embodiments and the move of a leaf object would use move leaf object. This introduces the concept of a multi-step partition operation. All current partition operations may be classified as single step multi-state operation. For example, a Join Partition performs only one step, i.e., the Join Operation although it may transition through several states before completing the operation. In this context a move subtree becomes a multi-step operation since it may first perform a split operation followed by a move operation.

Each of the steps in a multi-step operation are self contained and carry enough information to complete the operation in their respective Partition Control attributes. These Partition Control attributes are set up when the user issues the original request. The Partition Control type field are redefined to include a sequence number field as described below:

```
typedef struct PARTCNTL
{
    uint32   type;
    uint32   function;
    uint32   state;
    uint32   partnerPartID;
} PARTCNTL;
```

TABLE 11

| Field | Length | Values | Description |
|---|---|---|---|
| type | 4 Bytes | a) Sequence Number (2 bytes) b) type (2 bytes) One of: PCT_0, PCT_1, PCT_2, PCT_3, PCT_4 | The first two bytes contain the sequence number of the operation. For a multi-step operation the operations will be performed in sequence with the numerically lowest one being performed first. The second two bytes contain operation specific data. |
| function | 4 Bytes | One of following (4 bytes): PC_IDLE, PC_SPLITTING, PC_SPLITTING_CHILD, PC_JOINING_UP, PC_JOINING_DOWN, PC_MOVE_SUBTREE_SRC, PC_MOVE_SUBTREE_DEST, PC_LOCKED, PC_REPAIRING_TIMESTAMPS, PC_CHANGING_REPLICATYPE, etc. | Specifies the partition operation. Currently only the PC_MOVE_SUBTREE_SRC is defined to be a multi step operation. It may involve the following steps: 1. PC_SPLITTING 2. PC_MOVE_SUBTREE_SRC 3. PC_JOINING_UP |
| state | 4 Bytes | Operation Specific | Data is specific to the operation |
| partnerPartID | 4 Bytes | Operation Specific | Data is specific to the operation |

Figure 11:
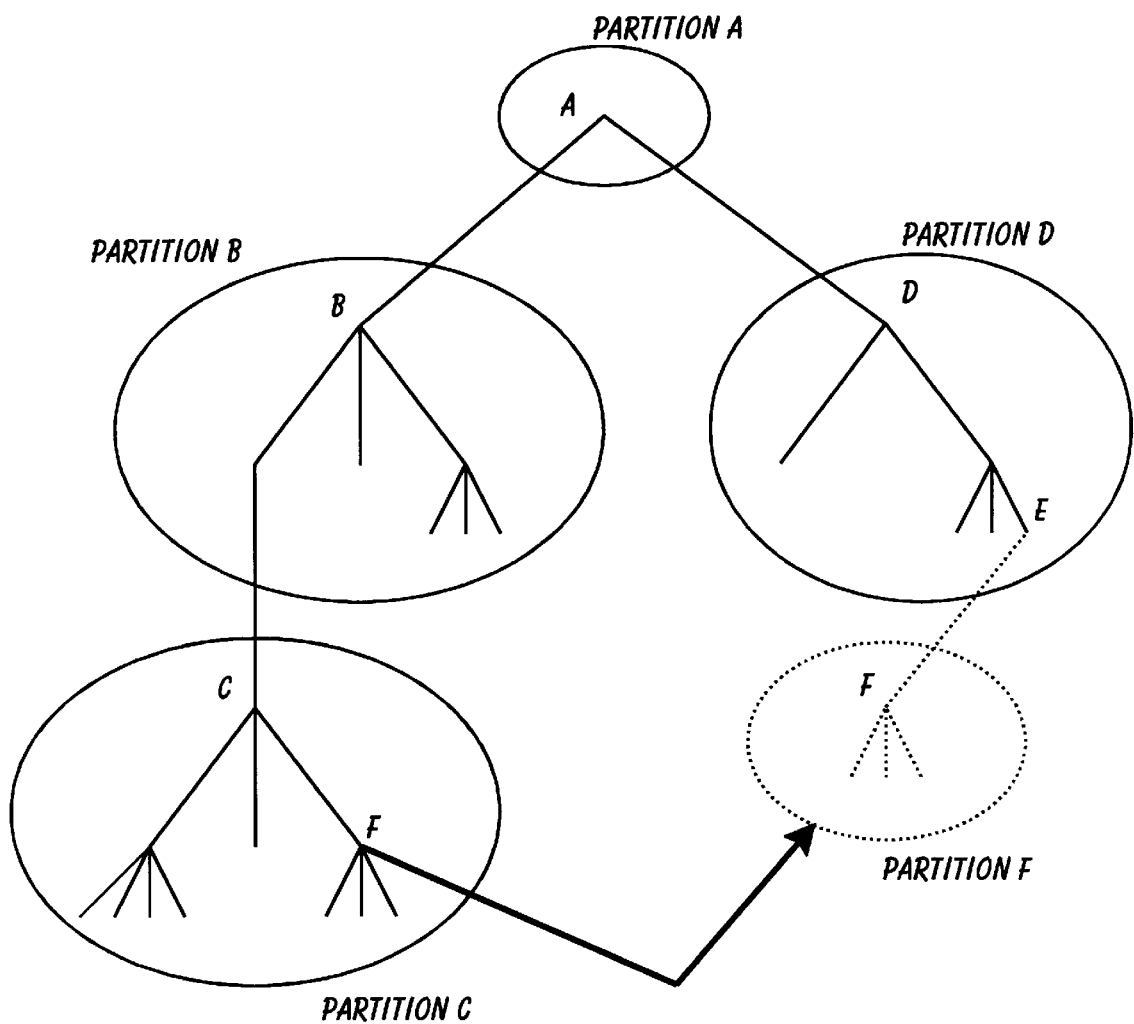
FIG. 11 shows a move of a non-root logical grouping.

Consider the proposed move depicted in FIG. 11. The non-root object F (the source object) is being moved from the parent object C to the destination object E. Two distinct partition operations are used, using the following Partition Control values:

1. Partition Split Operation Function PC_SPLITTING, Sequence Number=0
2. Move Subtree operation, as discussed above Function PC_MOVE_SUBTREE_SRC, Sequence Number=1

After the move subtree operation is completed, Partition F will remain in the distributed directory. If any of the operations are aborted, the entire sequence will be aborted. A sequence is started only after the previous sequence has been successfully completed. This approach could be used to build a queue of unrelated partition operations that the system would perform in sequence.

The Split Operation is initiated by sending a DSASplitPartition request to the server holding the partition's master replica. In the request, the container where the partition is splitting is identified in the New Partition Root Entry ID field. The server holding the master replica calls SetRingState to set the Replica State to RS_SS_0 for each replica. This server then calls SetPartitionControl to set the Partition State to Split State 0, and stores in its Partition Control attribute the split container's Distinguished Name and the current operation (Split Partition). The changes are propagated to all the partition's replicas and obituaries on the new partition root entry are processed. The Partition Control state is then set to RS_SS_1. The server holding the master replica sends a DSALowLevelSplit request to each of the partition's replicas (except subordinate references).

Servers holding replicas of the partition process the DSALowLevelSplit request by taking the partition attributes and values and copying them to the container to be split. These servers return a DSALowLevelSplit reply indicating success or failure. The server holding the master replica sets each replica's state to RS_SS_1, and then advances the partition state and all replica's states to RS_ON for both the parent partition and new partition. Lastly, the changes are propagated to all replicas through the synchronization process.

The DSASplitPartition request contains a completion code indicating success or failure, and includes the following information:

TABLE 12

| Field | Type | Description |
|---|---|---|
| Version | uint32 | 0. |
| Flags | uint32 | 0. |
| New Partition Root Entry ID | uint32 | The new partition root entry is Entry ID. |

The DSALowLevelSplit reply contains a completion code and the Entry ID of the new child partition's root entry, and includes the following information:

TABLE 13

| Field | Type | Description |
|---|---|---|
| Version | uint32 | 2. DNs are Ustrings. 3. DNs are Tuned Names. |
| Flags | uint32 | 0. |
| Iteration Handle | uint32 | |

TABLE 13-continued

| Field | Type | Description |
| --- | --- | --- |
| Parent Distinguished Name | Tuned Name | The Distinguished Name of the parent partition of the partition being split. |
| Align4 | | |
| Child Distinguished Name | Tuned Name | The entry that will be the partition root for the new partition. |

Figure 12:
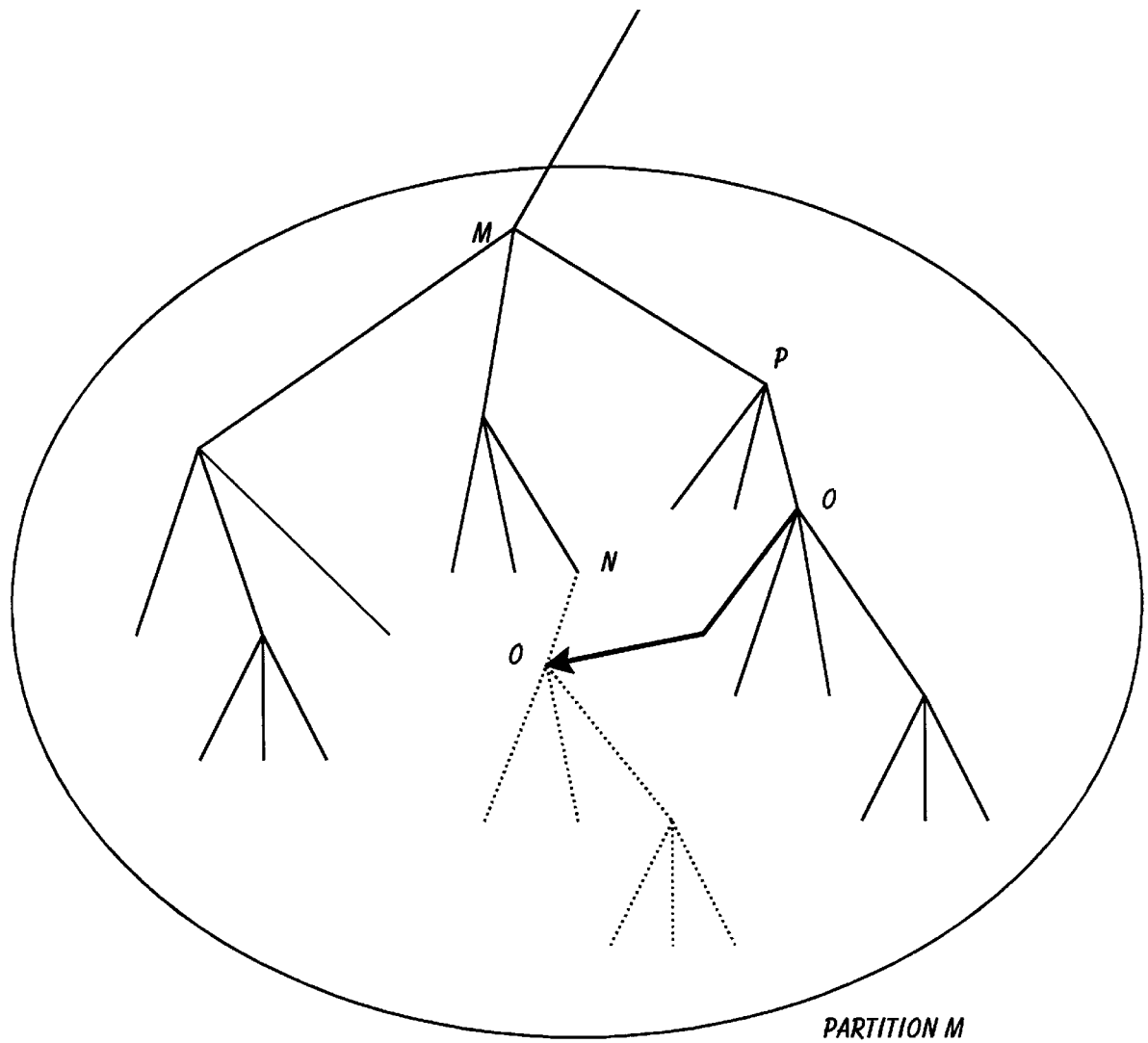
FIG. 12 shows a move of a non-root logical grouping within a partition.

As shown in FIG. 12, a non-root container object can be moved within a partition. In such a move, the same first two partition operations (i.e., split and move) will occur. In addition, a third operational partition operation, join, may also be employed as follows:

3. Join operation (for moves within a partition only)
Function PC_JOINING_UP, Sequence Number=2

Preferable, this embodiment includes a Partition Control type to keep track of the new Base Class of the moved object. If the base class is not being changed as a result of the move this value will not be created. This Partition Control value would contain the following information:

TABLE 14

| Field | Length | Values | Description |
| --- | --- | --- | --- |
| type | 4 Bytes | a) Sequence Number (2) b) type (2) PCT_3 | The sequence number would be the number corresponding to the Move operation PCT_0 Partition Control value. |
| function | 4 Bytes | PC_MOVE_SUBTREE_SRC, | Specifies Move operation |
| state | 4 Bytes | N.A. | N.A. |
| partnerPartID | 4 Bytes | class ID | Specifies the new base class of the moved object |

A Join Operation is initiated by sending a DSAJoinPartition request to the server holding the child partition's master replica. The Partition Root Entry ID field in the request identifies the partition root entry of the child partition. The Server holding the child's master replica calls DSAResolveName to locate the parent partition's master replica. Next, the server preferably checks that: (i) the request is valid, (ii) the child partition is not involved in another partition operation, and (iii) the software versions on the servers involved support joining the partitions. If all is okay, the server sends a DSAStartjoin request to the server holding the master replica of the parent partition.

The server holding the parent's master replica calls SetRingState and SetPartitionControl to set the parent replica's replica state and partition control state to RS_JS_0. Next, the replica state to RS_JS_0 is set for each of its replicas. The server sets its partition state to Join State 0, and stores in its Partition Control attribute: (i) the child partition's Distinguished Name, and (ii) the current operation (in this case, PC_JOINING_DOWN). The server returns a DSAStartJoin reply to the server holding the child partition's master replica.

The server holding the child's master replica sets the replica state to RS_JS_0 for each partition replica, and sets the partition state to RS_JS_0. The server then stores in its Partition Control attribute: (i) the parent partition's Distinguished Name, and (ii) the current operation (in this case, PC_JOINING_UP). The server returns a DSAJoinPartitions reply indicating success or failure. The synchronization process then propagates these changes to all replicas of both partitions.

Both servers compare replica rings to determine which servers they must add replicas to. DSAAddReplica requests are sent to other servers as follows: (i) servers containing replicas of the child partition, but not the parent, receive new replicas of the parent with new replica numbers, and (ii) servers containing replicas of the parent partition, but not the child, receive new replicas of the child partition (except subordinate references) with new replica numbers. The new replicas' states are set to RS_JS_1. The server holding the parent's master replica checks that the child partition's state is PC_JOINING_UP. If the state is not PC_JOINING_UP, the server calls SetRing State and SetPartitionControl to set the partition and replica states to RS_ON. This stops joining the partitions. If the state is PC_JOINING_UP the server sends a DSALowLeveljoin request to all servers holding replicas of the two partitions. Servers holding non-master replicas erase the boundary between the partitions and put all entries from both partitions into one partition.

Server holding the parent's master replica performs the LowLevelJoin operation on its replicas. The server sets the replica state of the new partition's replicas to RS_JS_2. The synchronization process propagates changes to all replicas. The server holding parent's master replica sets all replica states to RS_ON, and sets the replica types as follows: (i) the parent's master replica becomes the master replica of the new partition, (ii) the child's master replica and all read/write replicas become read/write replicas of the new partition, and (iii) read-only replicas become read-only replicas of the new partition. The synchronization process propagates these changes to all replicas. Partition operations can now resume.

The DSAJoinPartitions reply contains a completion code that indicates success or failure, and includes the following information:

TABLE 15

| Field | Type | Description |
| --- | --- | --- |
| Version | uint32 | 0. |
| Flags | uint32 | 0. |
| Partition Root Entry ID | uint32 | The Entry ID of the child partition's root entry. |

The DSAStartJoin reply contains a completion code that indicates success or failure, and includes the following information:

TABLE 16

| Field | Type | Description |
|---|---|---|
| Version | uint32 | 2. DNs are returned as Ustrings. 3. DNs are returned as Tuned Names. |
| Flags | uint32 | 0. |
| Iteration Handle | uint32 | |
| Parent DN | Tuned Name | The DN of the parent partition. |
| Align4 | | |
| Child DN | Tuned Name | The DN of the child partition's root entry. |

The DSALowLevelJoin reply contains a completion code indicating success or failure, and includes the following information:

TABLE 17

| Field | Type | Description |
|---|---|---|
| Version | uint32 | 2. DNs are Ustrings. 3. DNs are Tuned Names. |
| Flags | uint32 | 0. |
| Iteration Handle | uint32 | |
| Parent DN | Tuned Name | The Distinguished Name of the parent partition. |
| Align4 | | |
| Child DN | Tuned Name | The Distinguished Name of the child partition's root entry. |

With the present invention any logical group in a directory tree may be moved either within a directory or to another directory. With the invention, ease of providing administration of distributed network directories increases. Accordingly, use of distributed network directories will also increase, making pervasive network computing possible.

Any of the above described embodiments may be implemented in a computer readable medium storing software, programs, data, files and the like. As shown in FIG. 9, the computer readable medium is a floppy diskette. However, one with ordinary skill in the art will readily appreciate that computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", etc.), and the like.

The foregoing description of the preferred embodiment of the invention has been presented for purposes of illustration and description. It is not intended to exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

We claim:

1. A method in a computer system for reorganizing a distributed directory having a hierarchy of objects, comprising the steps of:
   a) identifying a non-root source object within a first logical group, said source having one or more subordinate objects, said source object being directly subordinate to a parent object;
   b) identifying a destination object;
   c) requesting to change the direct subordination of the source object to the destination object;
   d) checking if the requested change is permitted;
   e) if the requested change is permitted, splitting the first logical group at the source object whereby the source object becomes a root object for a second logical group;
   f) if first logical group was successfully split, reorganizing the hierarchy of objects in the distributed directory such that the source object is directly subordinate to the destination object.

2. A method as recited in claim 1, wherein the checking step comprises one or more of the following steps:
   (a) enforcing access control;
   (b) enforcing directory schema rules; or (c) checking whether a software version can support the requested change.

3. A method as recited in claim 1, further comprising the step of joining the second logical group with the first logical group after the step of reorganizing if the destination object is within the first logical group.

4. A method as recited in claim 1 wherein the step of reorganizing is achieved by one or more of the following steps:
   a) for each computer having at least one of the following:
      (i) a replica of the second logical group and a replica of the destination logical group,
      (ii) a replica of the second logical group and a reference to the root object of the destination logical group,
      (iii) a replica of the second logical group and neither a replica of the destination logical group nor a reference to the root object of the destination logical group, or
      (iv) a reference to the root object of the second logical group and a reference to the root object of the destination logical group, changing in each such computer the parent of the source object from the parent object to the destination object;
   b) for each computer having at least one of the following:
      (i) a reference to the source object and a replica of the destination logical group, or
      (ii) neither a replica of the second logical group nor a reference to source object, and a replica of the destination logical group, creating in each such computer a reference to the second logical group; and
   c) for each computer having a reference to the source object and neither a replica of the destination logical group nor a reference to the root object of the destination logical group, creating in each such computer a reference to the destination object.

5. A computer readable medium, comprising software capable of performing the method of claim 1.

6. A computer system capable of performing the method of claim 1.

7. A method as recited in claim 1, wherein the one or more of the logical groups is a partition in the distributed directory.

8. A method, in a computer system accessing a distributed directory having a hierarchy of logical groups of objects, for simultaneously reorganizing the hierarchy of one or more logical groups, comprising the steps of:
   a) identifying a plurality of source logical groups each having a root object, one or more of the objects in the plurality of source logical groups having a distinguished name representing the hierarchal sequence of the object in the distributed directory;
   b) identifying a destination object for each of the plurality of source logical groups;
   c) requesting a reorganization of the hierarchy that the root object for each of the source logical groups will be directly subordinate to the respective destination object;

d) reorganizing the hierarchy of logical groups in accordance with the request; and e) referring to objects in the source logical groups by the variations of the distinguished names in view of the requested reorganizations.

9. A method as recited in claim 8, wherein at least one of the source logical groups is a non-leaf partition.

10. A method as recited in claim 9, wherein at least one of the source logical groups is subordinate to another of the source logical groups.

11. A method as recited in claim 8, wherein one or more of the logical groups is a partition in the distributed directory.

12. A computer readable medium, comprising software capable of performing the method of claim 8.

13. A computer system capable of performing the method of claim 8.

14. A method as recited in claim 8, wherein the step of recognizing involves modifying the pointers in one or more computers such that the parent objects of the root object for the plurality of source logical groups is changed to the corresponding destination object.

15. A method as recited in claim 8, further comprising the step of referring to objects subordinate to the source logical groups by the variations of the distinguished names in view of the requested reorganizations.

16. A computer system, comprising:

a) a plurality of computers capable of sending information to and from one another;

b) a distributed directory accessed by the plurality of computers, said distributed directory having a hierarchy of objects;

c) a source logical group in the distributed directory, said source logical group comprising one or more objects having a distinguished name representing the hierarchal sequence of the object in the distributed directory, said source logical group further comprising a root object directly subordinate to a parent object;

d) a destination object in the distributed directory;

e) a reorganization mechanism capable of changing the subordination of the root object from being directly subordinate to the parent object to being directly subordinate to the destination object, wherein while the reorganization mechanism is changing the subordination of the root object the computers refer to one or more objects in the source logical group by one or more of the possible name states of the one or more objects.

17. A computer system as recited in claim 16, wherein the source logical group is a partition.

18. A computer system as recited in claim 16, wherein the variations of the distinguished name include changes in subordination of objects superior to the root source object.

19. A computer system as recited in claim 16, wherein the objects in the source logical groups may be accessed while the reorganization mechanism is changing the subordination of the source logical group.

20. A computer system as recited in claim 16, wherein the plurality of computers record references of the changing distinguished names of the objects in the source logical group.

21. A computer system as recited in claim 16, wherein at least one of the plurality of computers refers to the to one or more objects in the source logical group by one or more variations of the distinguished names known to the at least one computer.

* * * * *